United States Patent [19]
Harrington

[11] 3,856,119
[45] Dec. 24, 1974

[54] TRANSMISSION BRAKE MECHANISM

[75] Inventor: James A. Harrington, Mooresville, Ind.

[73] Assignee: General Motors Corporation, Detroit, Mich.

[22] Filed: Oct. 15, 1973

[21] Appl. No.: 406,158

Related U.S. Application Data

[63] Continuation-in-part of Ser. No. 382,007, July 23, 1973, abandoned.

[52] U.S. Cl............... 188/82.3, 74/577 R, 188/69, 188/82.7, 192/43.1, 192/46
[51] Int. Cl............................................ F16d 63/00
[58] Field of Search..... 188/82.2, 82.7, 82.3, 82.34, 188/21, 60, 69; 74/577 R; 192/43.1, 46

[56] References Cited
UNITED STATES PATENTS

| | | | |
|---|---|---|---|
| 1,203,685 | 11/1916 | Baker | 192/43.1 X |
| 1,425,233 | 8/1922 | Bolger | 188/69 X |
| 1,900,725 | 3/1933 | Moffett | 188/82.3 |
| 2,206,943 | 7/1940 | Costello | 192/43.1 |
| 2,670,064 | 2/1954 | Hasbany | 192/4 A |
| 3,144,776 | 8/1964 | Minke | 74/2 |

Primary Examiner—George E. A. Halvosa
Attorney, Agent, or Firm—Donald F. Scherer

[57] ABSTRACT

A transmission brake mechanism for restraining rotation of the transmission output shaft. An articulated arm or linkage system is provided in which a first link is pivotably connected to the transmission housing and a second link is pivotably connected to the first link. The second link has a toothed portion adapted to engage a toothed element or gear on the output shaft. A fulcrum point is provided on the second link such that during disengagement of the brake the second link becomes a second class lever, to provide a mechanical advantage to the operator, for assisting in disengagement of the teeth.

4 Claims, 3 Drawing Figures

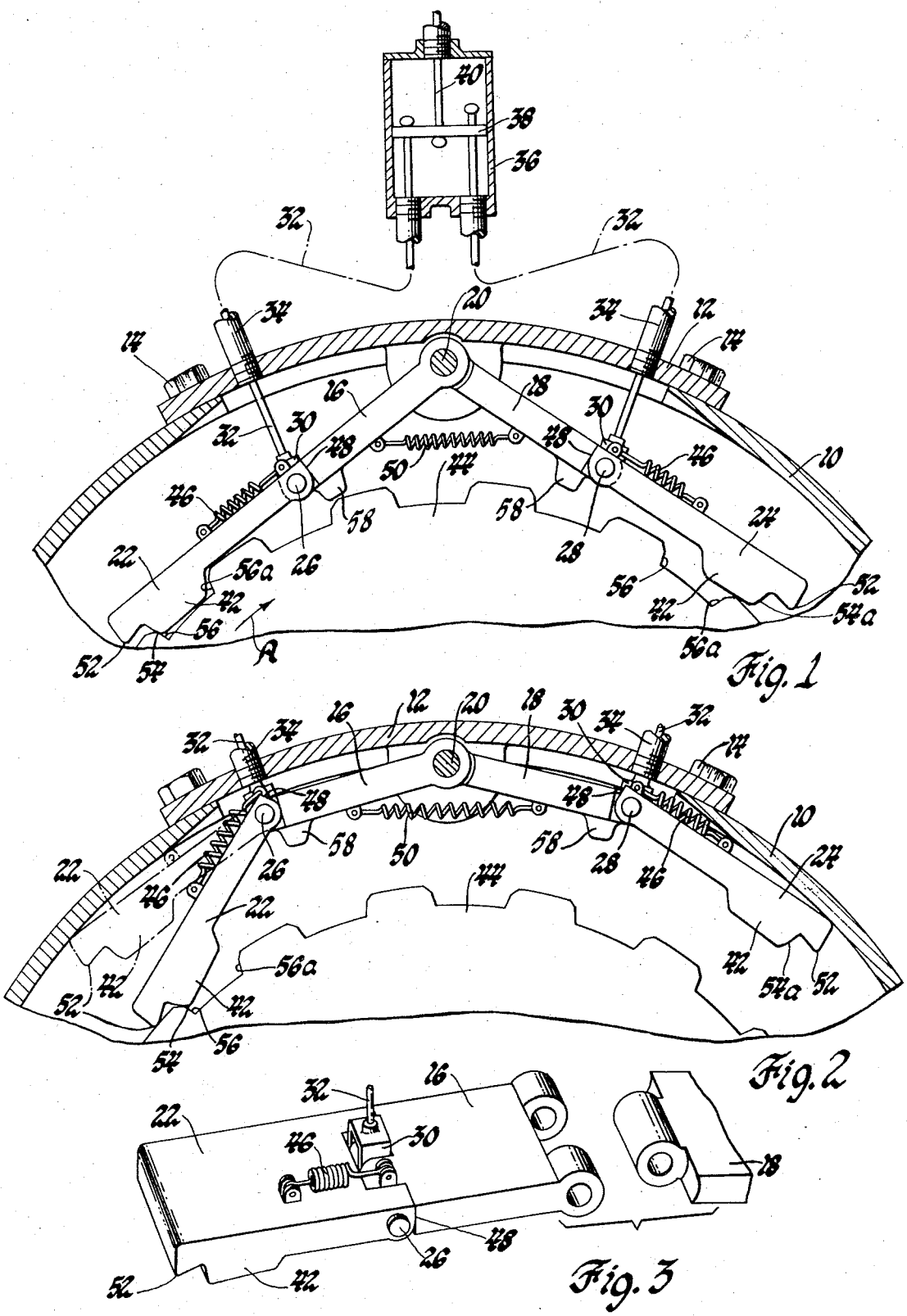

TRANSMISSION BRAKE MECHANISM

This is a continuation-in-part of Ser. No. 382,007, filed July 23, 1973, now abandoned.

This invention relates to brakes and more particularly to transmission brakes for mechanically locking the output shaft.

Transmission parking brakes generally used a ratchet or pawl to lock the transmission output to prevent vehicle movement when the vehicle is parked. Many of these transmission parking brakes have self energizing frictional force characteristics which resist the release or unlocking forces. This is especially true in heavy vehicles such as trucks, when the vehicle is parked on a slope.

The present invention utilizes a pawl which engages a tooth member secured to the transmission output shaft. The pawl is formed on a linkage which is articulated. The linkage has included thereof a fulcrum point adjacent the pawl, which fulcrum point contacts the tooth member such that a second class lever is established in the linkage system to provide the operator with additional mechanical advantage for unlocking the brake mechanism.

In the preferred embodiment, the present invention includes two sets of linkages which are pivotally mounted on a common axis in the transmission housing such that one linkage provides braking action to resist impending forward rotation while the other linkage provides braking action to resist impending reverse rotation. The linkages are adapted to be manually operated through a cable by the operator such that when the transmission manual control lever is moved to the park position, the linkages are drawn into engagement with the transmission output shaft by a spring.

It is an object of this invention to provide in an improved mechanism brake mechanism having an articulated linkage rotatably mounted on the transmission casing including a toothed pawl which engages the output shaft for braking and a fulcrum point which abuts the output shaft during unlocking of the mechanism to provide a mechanical advantage to the operator.

It is another object of this invention to provide an improved transmission parking brake in which a pair of articulated linkages are pivotally mounted on the transmission housing and are adapted to be moved into and out of engagement with a toothed member on the transmission output shaft, and wherein each linkage has a toothed pawl for engagement and a fulcrum point adjacent the pawl, which contacts the transmission member during disengagement, to provide mechanical advantage for the operator.

These and other objects and advantages of the present invention will be more apparent from the following description and drawings in which:

FIG. 1 is a sectional elevational view of the preferred embodiment of the invention showing the brake in an engaged position;

FIG. 2 is an elevational sectional view showing the disengagement of the braking mechanism; and FIG. 3 is an isometric view of the parking brake linkage.

Referring to the drawings, there is shown a transmission housing 10 to which is secured a cover plate 12 by a plurality of threaded fasteners 14. A pair of links 16 and 18 are pivotally mounted on a pin 20 which is positioned in the covering plate 12. A second pair of links 22 and 24 are pivotally connected by pins 26 and 28 respectively to the links 16 and 18 respectively.

As seen in FIG. 3, the pivotal connection of the links 16 and 18 also has connected thereto a bracket 30 which is secured to a cable or wire 32. The cable 32 is directed through a sheath 34, which sheath 34 is threadably connected to the housing 12 and into a transmission control housing 36. The cables 32 are adapted to abut a retainer plate 38 which retainer plate has controlled movement through a cable 40 which is connected to a conventional transmission control lever, not shown.

The links 22 and 24 each have a pawl tooth 42 which are adapted to engage with a tooth member 44 which is secured to a transmission output shaft not shown. The linkages 22 and 24 each have connected thereto a spring 46, which spring 46 is also connected to the links 16 and 18 to urge the links 16 and 22 and 18 and 24 respectively into substantial alignment when the brake mechanism is moved to the engaged or disengaged position. The links 22 and 24 have formed thereon shoulder portions 48 which abut a surface on the link 16 when the brake mechanism is moved to the engaged position, shown in FIG. 1, to limit the articulation of the linkages. The links 16 and 18 are connected together by a spring 50 which causes the linkages to rotate toward the tooth member 44 when the cable 40 is moved to the park position and also permits the linkages 16 and 18 to rotate away from each other when the cable 40 is moved to disengage the parking brake.

The links 22 and 24 each have an end portion 52 which provides a fulcrum point during disengagement of the brake. As seen in FIG. 1, when the brake member is engaged, the pawl 42 on link 22 is engaged between the teeth of the member 44. The pawl 42 has a leading edge 54 which is formed thereon to coact with the sides 56 of the teeth on the toothed member 44. As discussed in U.S. Pat. No. 2,670,064, the angle of edge 54 and side 56 can be structured to ensure that the pawl 42 will remain engaged with the toothed member 44. That is, the pawl will not have a tendency to disengage under load. In a like manner the pawl 42 of link 24 has a leading edge 54a which coacts with tooth sides 56a.

Each link 16 and 18 have a stop member 58 formed thereon. The stop member 58 abuts a tooth on member 44 to assist the shoulder 48 in limiting the articulation of the linkage when large brake forces are present, such as when the vehicle is parked on a steep slope.

As seen in FIG. 1, only one of the pawls 42 is engaged with the toothed member 44. The other pawl 42 abuts the upper surface of a tooth on the toothed member 44. The pawl 42 on link 22 engages the toothed member when the toothed member 44 is trying to rotate in the direction of Arrow A. The pawl 42 on link 24 will engage the toothed member 44 when the impending rotation is opposite to Arrow A. It is readily understood that by knowing the spacing of the teeth on the toothed member 44, the linkages can be designed with the proper link to permit this engagement.

When the brake is engaged, the links 16 and 22 or 18 and 24, form a load supporting column between the tooth surface 56 or 56a and the pin 20.

FIG. 2 shows the sequence of movements as the parking brake is unlocked. As shown in solid lines in FIG. 2, it is seen that the fulcrum point 52 abuts the outer circumference of the toothed member 44 such that link 22 forms a second class lever with the input force on pin 26 the output force on surface 54 and the reaction force at the fulcrum 52. This provides the operator with a mechanical advantage to lift the pawl 42 out of engagement with the toothed member 44. Once the pawl 42 is free of the toothed member 44, the link 22 will be pulled by spring 46 into substantial alignment with the link 16 as shown in the phantom lines in FIG. 2.

Obviously, many modifications and variations of the present invention are possible in light of the above teachings. It is, therefore, to be understood that within the scope of the appended claims the invention may be practiced otherwise than as specifically described.

What is claimed is:

1. A transmission brake mechanism for use in a transmission having a housing and an output shaft with a toothed element drivingly connected thereto, said mechanism comprising; a first link pivotally connected to the housing; a second link having a toothed portion intermediate the ends of said second link and fulcrum point means adjacent one end of said second link; means for pivotally connecting said second link and said first link; operating means for selectively moving said second link for engaging said tooth portion with said toothed element with said fulcrum point spaced from said toothed element and for disengaging said toothed portion from said toothed element; spring means for urging said first and second links into substantially a single plane in the engaged and disengaged position and for permitting relative pivotal movement between said links during disengagement; said fulcrum point means contacting said toothed element during disengagement for establishing said second link as a second class lever for providing assistance during disengagement of said toothed portion.

2. A transmission brake mechanism for use in a transmission having a housing and an output shaft with a toothed element drivingly connected thereto, said mechanism comprising; pin means operatively connected to said housing; first linkage means including a first link pivotally connected to said pin means, a second link having a toothed portion intermediate the ends of said second link and fulcrum point means adjacent one end of said second link, and means for pivotally connecting said second link and said first link; second linkage means including a first link pivotally connected to said housing, a second link having a toothed portion intermediate the ends thereof and fulcrum point means adjacent one end thereof, and means for pivotally connecting said first and second links; operating means for selectively moving both said second links toward engaging said tooth portions thereon with said toothed element with said fulcrum point spaced from said toothed element and for disengaging said toothed portions from said toothed element, one of said second links' toothed portion engaging said toothed element when the output shaft has impending rotation in one direction and the other second link tooth portion engaging said toothed element when the opposite rotation is impending; spring means connected between each of said first and second links for urging said first and second links into substantially single planes in the engaged and disengaged position and for permitting relative pivotal movement between said links during disengagement; said fulcrum point means of the engaged second link contacting said toothed element during disengagement for establishing said engaged second link as a second class lever for providing assistance during disengagement of said toothed portion.

3. A transmission brake mechanism for use in a transmission having a housing and an output shaft with a toothed element drivingly connected thereto, said mechanism comprising; a first link pivotally connected to the housing; a second link having a toothed portion intermediate the ends of said second link and fulcrum point means adjacent one end of said second link and a shoulder portion adjacent the other end thereof; means for pivotally connecting said second link, at the end adjacent said shoulder portion, and said first link; operating means for selectively moving said second link for engaging said tooth portion with said toothed element with said fulcrum point spaced from said toothed elements and for disengaging said toothed portion from said toothed element; spring means operatively connected to said first and second link for urging said shoulder portion of said second link into abutting relation with said first link for maintaining said first and second links in substantially a single plane in the engaged and disengaged position and for permitting relative pivotal movement between said links during disengagement; said fulcrum point means contacting said toothed element during disengagement for establishing said second link as a second class lever for providing assistance during disengagement of said toothed portion.

4. A locking mechanism for a toothed wheel, comprising in combination; a pair of arms pivotally supported at a point outboard the wheel; means urging the arms to a wheel-engaging relatively tangential position, the arms having teeth effective to fit into the teeth of said wheel and in the wheel-engaging position being spaced circumferentially of the wheel by less than an integral number of wheel teeth, whereby in one direction of wheel rotation the tooth of one of the arms seats between a pair of teeth of the wheel to lock the same and in the other direction of wheel rotation the tooth of the other of the arms seats between a pair of teeth of the wheel to lock the same, each said locking serving to exert a column force on the one arm or other arm as the case may be, each of the arms being articulated between the tooth portion and the point of pivotal support and, in the tooth-engaging position, extending beyond the tooth in juxtaposition with and spaced from the tooth of the wheel; means effective to pull each arm in the radially outboard direction of the wheel at its point of articulation so as to seat said extending portion against the tooth of the wheel and pry the arm out of tooth-engaging relation to the wheel; and, resilient elements urging each arm to a column-defining orientation at its point of articulation.

* * * * *